(12) United States Patent
Uchino et al.

(10) Patent No.: US 11,121,830 B2
(45) Date of Patent: Sep. 14, 2021

(54) COMMUNICATION SYSTEM HAVING A CENTRAL AGGREGATION DEVICE AND A REMOTE DEVICE

(71) Applicant: NTT DOCOMO, INC., Tokyo (JP)

(72) Inventors: Tooru Uchino, Tokyo (JP); Naoto Ookubo, Tokyo (JP); Anil Umesh, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/309,163

(22) PCT Filed: Feb. 28, 2017

(86) PCT No.: PCT/JP2017/007785
§ 371 (c)(1),
(2) Date: Dec. 12, 2018

(87) PCT Pub. No.: WO2017/217024
PCT Pub. Date: Dec. 21, 2017

(65) Prior Publication Data
US 2019/0132094 A1    May 2, 2019

(30) Foreign Application Priority Data
Jun. 14, 2016    (JP) .............................. JP2016-118051

(51) Int. Cl.
*H04L 5/00* (2006.01)
*H04W 88/08* (2009.01)
(Continued)

(52) U.S. Cl.
CPC ............ *H04L 5/0007* (2013.01); *H04L 1/009* (2013.01); *H04L 27/263* (2013.01);
(Continued)

(58) Field of Classification Search
CPC ..... H04L 5/0007; H04L 1/009; H04L 27/263; H04L 27/2627; H04W 88/08; H04W 92/16
See application file for complete search history.

(56) References Cited

U.S. PATENT DOCUMENTS

2010/0232544 A1 *  9/2010  Myung ................. H04L 1/0057
                                                              375/295
2013/0136193 A1    5/2013  Hwang et al.
(Continued)

FOREIGN PATENT DOCUMENTS

JP    2007-274048 A    10/2007
JP    2012-028875 A     2/2012
(Continued)

OTHER PUBLICATIONS

International Search Report issued in PCT/JP2017/007785 dated May 16, 2017 (2 pages).
(Continued)

*Primary Examiner* — Jeffrey M Rutkowski
*Assistant Examiner* — Chae S Lee
(74) *Attorney, Agent, or Firm* — Osha Bergman Watanabe & Burton LLP

(57) ABSTRACT

Provided is a communication system that can sustain a reduction in delay in FFT/IFFT processing by code blocking user data, even in a case where the functions of upper layers such as a MAC scheduler and the function of the radio physical layer are implemented separately. In a radio base station (communication system) including a central aggregation device 210 and a remote device 220, the central aggregation device 210 transmits code blocks in a number necessary for generating an OFDM symbol as a piece of data to the remote device 220, the code blocks being produced by dividing user data into units of encoding processing.

3 Claims, 13 Drawing Sheets

(51) Int. Cl.
*H04W 92/16* (2009.01)
*H04L 1/00* (2006.01)
*H04L 27/26* (2006.01)

(52) U.S. Cl.
CPC ......... *H04L 27/2627* (2013.01); *H04W 88/08* (2013.01); *H04W 92/16* (2013.01)

(56) References Cited

U.S. PATENT DOCUMENTS

| | | | |
|---|---|---|---|
| 2016/0241682 A1* | 8/2016 | Xu | H04L 1/0068 |
| 2017/0150497 A1* | 5/2017 | Boldi | H04L 5/0007 |
| 2018/0123847 A1* | 5/2018 | Xu | H04L 5/0046 |
| 2018/0248726 A1* | 8/2018 | Wang | H04L 1/0041 |

FOREIGN PATENT DOCUMENTS

| | | |
|---|---|---|
| JP | 2015-500587 A | 1/2015 |
| WO | 2010/061590 A1 | 6/2010 |

OTHER PUBLICATIONS

Written Opinion of the International Searching Authority issued in PCT/JP2017/007785 dated May 16, 2017 (4 pages).
NTT Docomo, Inc.; "5G Vision for 2020 and Beyond"; 3GPP Ran workshop on 5G, RWS-150051; Phoenix, AZ, USA; Sep. 17-18, 2015 (23 pages).
Office Action in counterpart Japanese Patent Application No. 2018-523310 dated Apr. 6, 2021 (6 pages).

\* cited by examiner

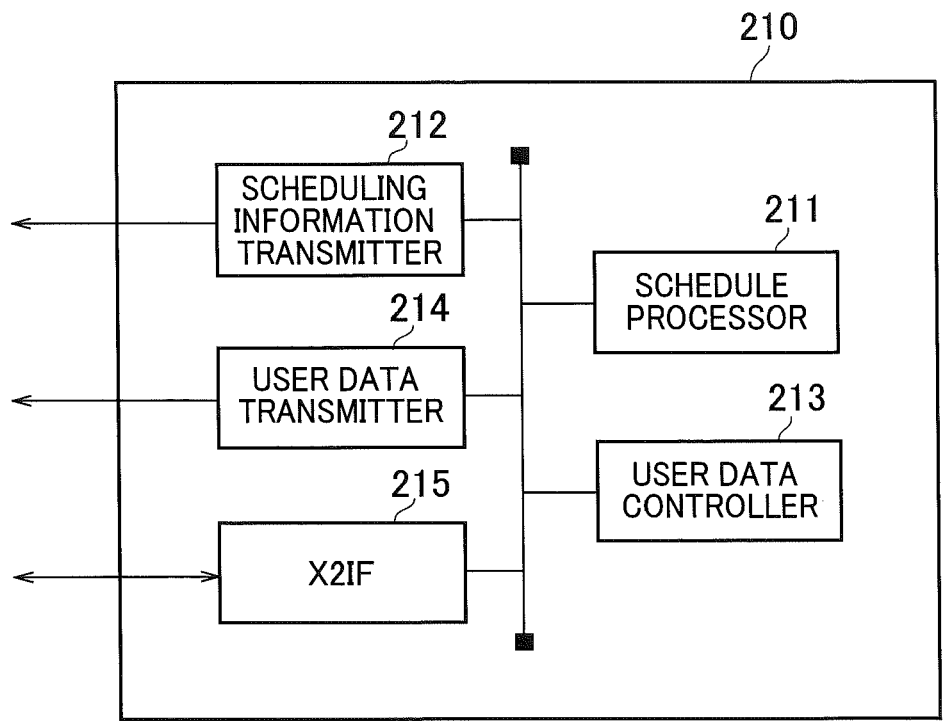
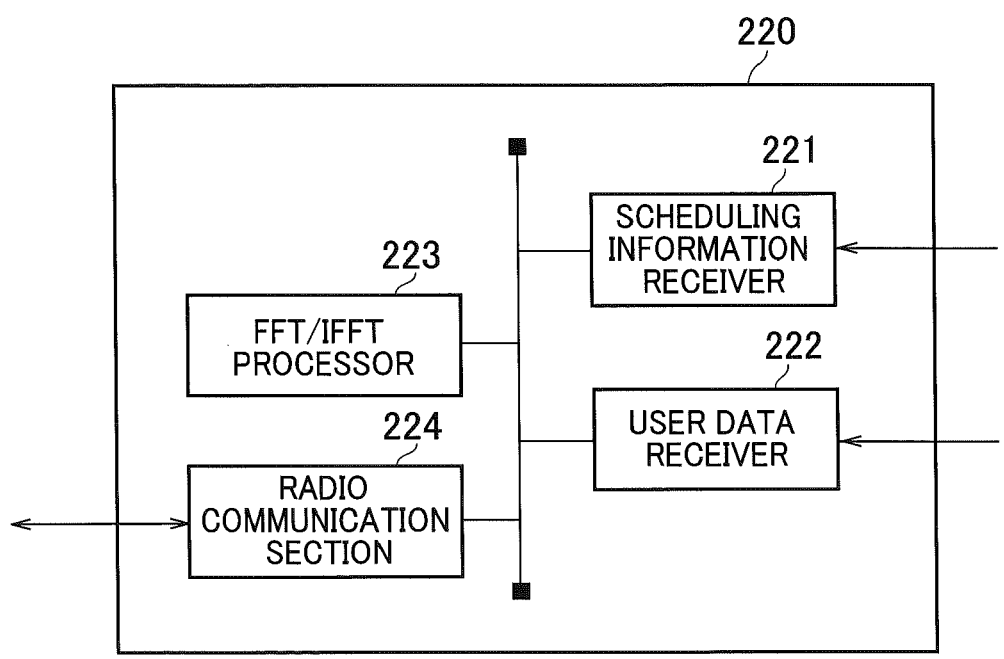

FIG. 7

| METRIC M#i OF EACH USER EQUIPMENT UE#i (NumCB#i,Mstep#i) | | | OPERATIONS OF CENTRAL CONCENTRATOR | OPERATIONS OF FEEDER | |
|---|---|---|---|---|---|
| UE#1 (3, 12/3 = 4) | UE#2 (4, 12/4 =3) | UE#3 (2, 12/2 = 6) | | | |
| 0* | 0* | 0* | INITIALIZE METRICS | — | t=0 |
| 4 | 0* | 0* | TRANSMIT CB#1 OF UE#1 | — | |
| 4 | 3 | 0* | TRANSMIT CB#1 OF UE#2 | — | t=1 |
| 4 | 3* | 6 | TRANSMIT CB#1 OF UE#3 | GENERATABLE UP TO THIRD OFDM SYMBOL | |
| 4* | 6 | 6 | TRANSMIT CB#2 OF UE#2 | GENERATABLE UP TO FOURTH OFDM SYMBOL | t=2 |
| 8 | 6* | 6* | TRANSMIT CB#2 OF UE#1 | GENERATABLE UP TO SIXTH OFDM SYMBOL | t=3 |
| 8 | 9 | 6* | TRANSMIT CB#3 OF UE#2 | — | |
| 8* | 9 | 12 | TRANSMIT CB#2 OF UE#3 | GENERATABLE UP TO EIGHTH OFDM SYMBOL | |
| 12 | 9* | 12 | TRANSMIT CB#3 OF UE#1 | GENERATABLE UP TO NINTH OFDM SYMBOL | |
| 12* | 12* | 12* | TRANSMIT CB#4 OF UE#2 | GENERATABLE UP TO TWELFTH OFDM SYMBOL | |

(NOTE) "*" INDICATES SMALLEST METRIC AT PREDETERMINED TIME

TIME →

COMMUNICATION SYSTEM HAVING A CENTRAL AGGREGATION DEVICE AND A REMOTE DEVICE

TECHNICAL FIELD

The present invention relates to a radio base station (communication system) that includes a central aggregation device and a remote device and performs radio communication with user device.

BACKGROUND ART

3rd Generation Partnership Project (3GPP) specifies, with the aim of further speeding Long Term Evolution (LTE), LTE-Advanced (hereinbelow, the LTE includes the LTE-Advanced). Moreover, in the 3GPP, specification of succeeding systems of the LTE called 5G (5th generation mobile communication system) and the like is being considered.

So-called C-RAN radio base station including a central aggregation device having a scheduler function (MAC scheduler) and the like in MAC layer, and a remote device arranged at a remote installation site from the central aggregation device is used in the LTE. The remote device includes a radio unit (RF unit) such as PA (Power Amplifier)/LNA (Low Noise Amplifier), a radio transmission—reception module, and a modulation—demodulation module. The central aggregation device and the remote device are connected to each other by a wired transmission path called a fronthaul. For example, Common Public Radio Interface (CPRI) is known as an interface between the central aggregation device and the remote device.

On the occasion of consideration of the specification of the 5G, it is proposed (for example, see Non-Patent Document 1) to mount the function of a radio physical layer (layer 1) in the remote device that used to be mounted in the central aggregation device until now.

PRIOR ART DOCUMENT

Non-Patent Document

Non-Patent Document 1: 3GPP RWS-150051 (3GPP RAN workshop on 5G), "5G Vision for 2020 and Beyond", 3GPP, September 2015

SUMMARY OF THE INVENTION

However, the following problem is involved in the case where the remote device is equipped with the function of the radio physical layer, which has been implemented on the central aggregation device until now. That is, in LTE, in transmission of user data to user device via a PDSCH (Physical Downlink Shared Channel), the radio physical layer divides the user data in a transport block to be transmitted into multiple code blocks (unit blocks of encoding processing), and performs processing such as encoding on each code block. To be more specific, the radio physical layer encodes the code blocks, generates each OFDM symbol by using some of the multiple encoded code blocks, and performs FFT/IFFT processing on each OFDM symbol. Since the processing on user data is performed in units of code blocks, there is no need to wait for processing of succeeding data. Thus, delay in the FFT/IFFT processing can be reduced.

Meanwhile, in a case where the functions of upper layers such as the MAC scheduler are implemented on the central aggregation device as in the conventional case, whereas the function of the radio physical layer is separately implemented on the remote device, it is also desirable to sustain such a reduction in the delay in the FFT/IFFT processing by code blocking user data. To this end, however, the forwarding of user data by the central aggregation device is required to take the timing of the FFT/IFFT processing into account.

However, since only the specification in which the central aggregation device notifies the remote device of an identifier of the user data has been discussed, the remote device cannot know which code block the FFT/IFFT processing should be applied to.

Hence, the present invention has been made in view of the above state, and an objective thereof is to provide a communication system that, even in a case where the functions of upper layers such as a MAC scheduler and the function of a radio physical layer are implemented separately, can sustain a reduction in delay in FFT/IFFT processing by code blocking user data.

A communication system according to an aspect of the present invention is a communication system including a first communication device and a second communication device, in which the first communication device includes a data transmitter that transmits multiple divided data blocks to the second communication device, the multiple divided data blocks being produced by dividing user data into units of encoding processing, the second communication device includes a symbol generator that generates OFDM symbols by using the multiple divided data blocks, and the data transmitter transmits the divided data blocks in a number necessary for generating a single OFDM symbol as a piece of data.

A communication system according to an aspect of the present invention is a communication system including a first communication device and a second communication device, in which the first communication device includes a data transmitter that transmits multiple divided data blocks to the second communication device, the multiple divided data blocks being produced by dividing user data into units of encoding processing and an information transmitter that transmits data structure information to the second communication device, the data structure information indicating a structure of a certain two or more number of the divided data blocks to be allocated to a single OFDM symbol to be generated by the second communication device, and the second communication device includes a symbol generator that generates OFDM symbols by using the multiple divided data blocks and the data structure information.

BRIEF DESCRIPTION OF THE DRAWINGS

FIG. 3 is a functional block configuration diagram of a central aggregation device 210 for 5G.

FIG. 4 is a functional block configuration diagram of a remote device 220 for 5G.

FIG. 7 is a diagram illustrating metrics used for transmitting each code block and an example of operations of the central aggregation device 210 and the remote device 220 at each timing.

MODES FOR CARRYING OUT THE INVENTION

Next, embodiments of the present invention will be described based on the drawings. Note that the same or similar reference signs denote the same or similar functions and structures, and descriptions thereof are omitted as appropriate.

Figure 1:
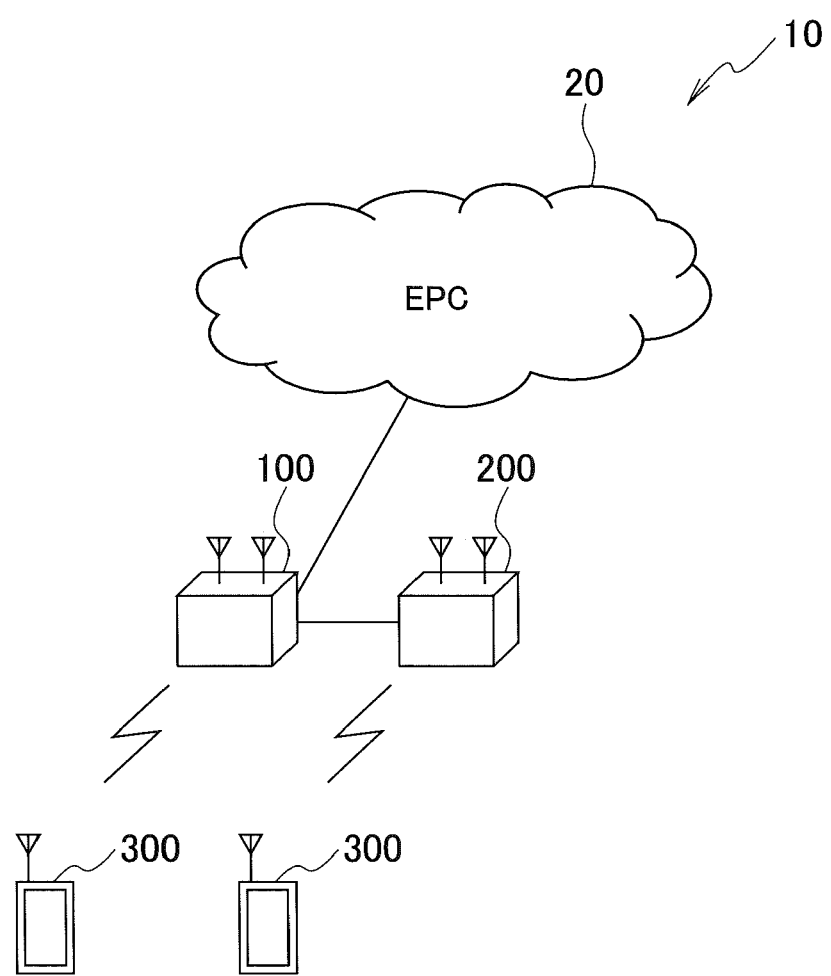
FIG. 1 is an overall schematic configuration diagram of a radio communication system 10 according to the present embodiment.

First Embodiment (1) Overall Structural Configuration of Radio Communication System FIG. 1 is an overall structural diagram of a radio communication system 10 according to the present embodiment. The radio communication system 10 conforms to Long Term Evolution (LTE) and "5G", which is the succeeding system of LTE. Note that, in view of comparing to 5G, LTE (including LTE-Advanced) is called "4G" when necessary in the present embodiment. In addition, in the present embodiment, a structure of the radio communication system 10 right after 5G is introduced is assumed, and LTE assisted operation in which 5G complements 4G is implemented. Note that the present embodiment is also applicable to a radio communication system such as a Standalone radio communication system capable of communicating only with 5G, and the radio communication system 10 in other generations, besides the LTE assisted operation that complements 4G. Application systems to which the present embodiment can be applied will be described later.

The radio communication system 10 includes a core network 20, a radio base station 100, a radio base station 200, and user device 300.

The core network 20, also called an EPC (Evolved Packet Core), includes a mobility management entity (MME), a serving gateway (S-GW), a PDN gateway (P-GW), and the like.

The radio base station 100, also called eNodeB, is a radio base station conforming to 4G. The radio base station 100 is connected to a device (node) including the core network 20 via an S1-MME or an S1-U interface.

The radio base station 200 is a radio base station conforming to 5G. The radio base station 200 is connected to the radio base station 100 via an X2 interface (X2-AP' interface, X2-U' interface, for example).

The user device 300 is capable of performing radio communications with the radio base station 100 and the radio base station 200. The user device 300 may be called a radio communication terminal or a mobile station. By controlling radio signals transmitted from multiple antenna elements, the radio base station 200 and the user device 300 can support: a Massive MIMO, which generates a beam with much higher directivity; carrier aggregation (CA), which uses multiple component carriers (CC); and dual connectivity (DC), which allows for concurrent transmission of component carriers between multiple radio base stations and the user device 300.

Figure 2:
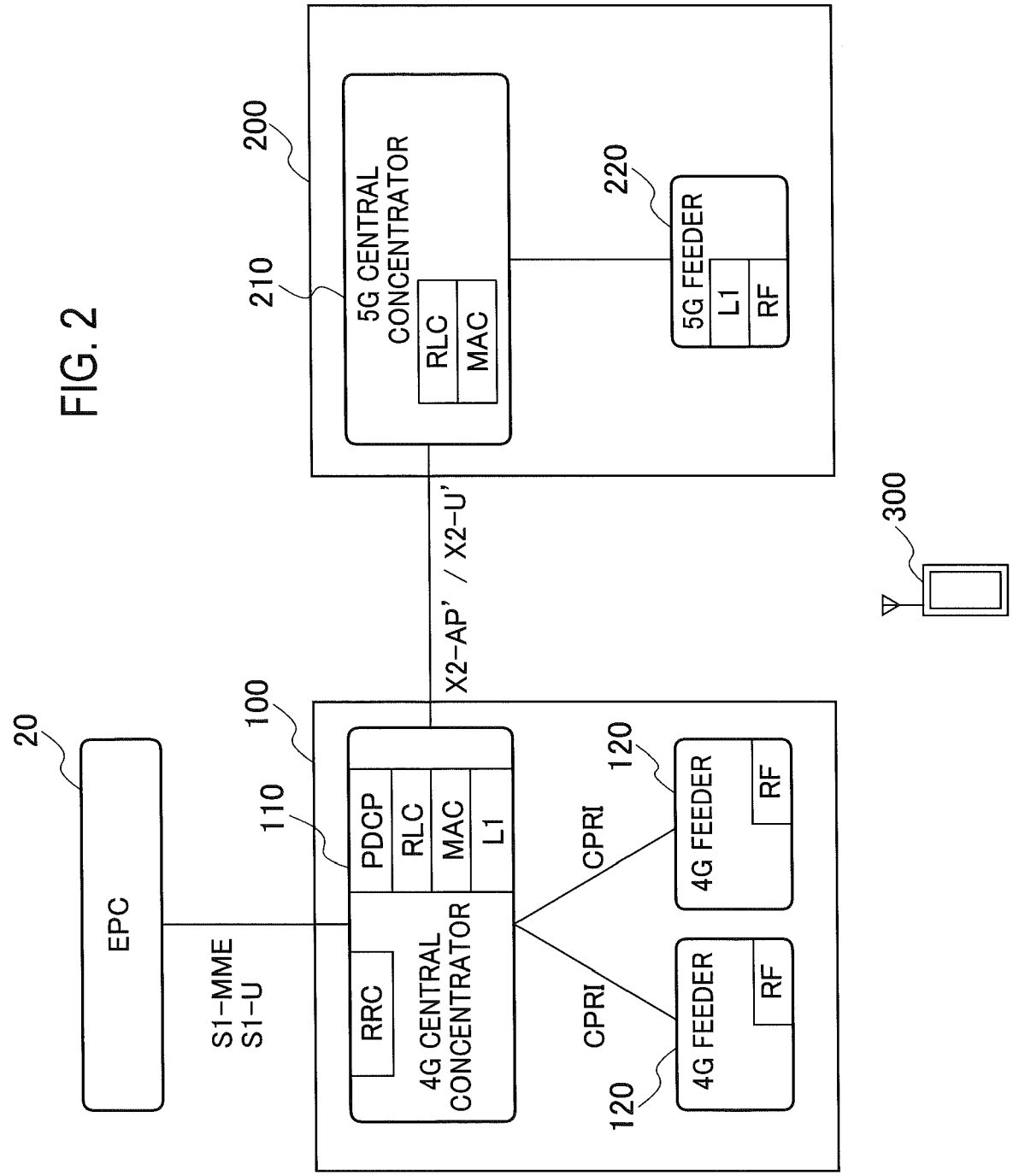
FIG. 2 is an overall block configuration diagram of the radio communication system 10.

FIG. 2 is an overall block configuration diagram of the radio communication system 10. As illustrated in FIG. 2, the radio base station 100 includes a central aggregation device 110 and remote devices 120. Likewise, the radio base station 200 includes a central aggregation device 210 and a remote device 220. The radio base station 100 and the radio base station 200 may include another device besides the central aggregation device and the remote device.

The central aggregation device 110 has a radio physical layer (L1), a medium access control layer (MAC), a radio link control layer (RLC), and a packet data convergence protocol layer (PDCP). In addition, the central aggregation device 110 has a radio resource control layer (RRC) as an upper layer of the PDCP.

The remote devices 120 can be extended an arranged remotely from a place where the central aggregation device 110 is installed. In addition, each remote device 120 has a radio section (RF) such as a PA (Power Amplifier)/an LNA (Low Noise Amplifier), a radio transmission and reception module, and a modulation-demodulation module.

The central aggregation device 110 is also called a central unit, and the remote devices 120 are also called remote units. The central aggregation device 110 is connected with each remote device 120 via wired transmission channels called fronthaul. For example, CPRIs (Common Public Radio Interfaces) are used as an interface for the central aggregation device 110 and the remote devices 120.

The central aggregation device 210 (first communication device) and the remote device 220 (second communication device) correspond to the above-described central aggregation device 110 and the remote devices 120; however, their layer structures are different. Specifically, the central aggregation device 210 has a medium access control layer (MAC) and a radio link control layer (RLC). The remote device 220 has a radio physical layer (L1) and a radio section (RF). Note that, as described above, the central aggregation device 210 is connected with the central aggregation device 110 via the X2 interface.

(2) Functional Block Configuration of Radio Communication System

Next, descriptions will be provided for the functional block configuration of the radio communication system 10. Specifically, the functional block configuration of the central aggregation device 210 and the remote device 220 in the radio base station 200 will be described.

(2.1) Central Aggregation Device 210

FIG. 3 is a functional block configuration diagram of the central aggregation device 210 for 5G. As illustrated in FIG. 3, the central aggregation device 210 includes a schedule processor 211, a scheduling information transmitter 212, a user data controller 213, a user data transmitter 214, and an X2IF 215.

The schedule processor 211 (MAC scheduler) performs schedule processing to determine which radio resource is allocated to which user device 300. Specifically, the schedule processor 211 generates scheduling information (allocation information of radio resources) for the user device 300 that is selected by the schedule processing. The scheduling information includes the number of RBs (Resource Block), an MCS (Modulation and Coding Scheme), a TBS (Transport Block Size), the number of transmission Ranks, the number of downlink assignments (DL assignments), and the like, for example.

The scheduling information transmitter 212 transmits the scheduling information generated by the schedule processor 211 to the remote device 220.

Out of multiple code blocks (multiple divided data blocks) that are produced by dividing the user data in a transport block into units of encoding processing (encoding), the user data controller 213 cuts out, from the user data, code blocks (divided data blocks) in a number necessary for generating each OFDM symbol generated by the remote device 220. For example, the user data controller 213 cuts out "a necessary number of code blocks for generating each OFDM symbol" from the code blocks of the user data. "Cut out" means to cut the code blocks and separate "a necessary number of code blocks for generating each OFDM symbol" as a piece of data from the whole, for example. Otherwise, the user data controller 213 may cut out "as many code blocks as the number of bits necessary for generating each OFDM symbol" instead of cutting out "a necessary number of code blocks for generating each OFDM symbol". The same applies hereafter.

The user data transmitter 214 transmits "a necessary number of code blocks for generating each OFDM symbol", which is cut out from the user data by the user data controller 213, as a piece of data to the remote device 220. For example, the user data transmitter 214 transmits a piece of data that is compiled as "a necessary number of code blocks for generating each OFDM symbol".

The X2IF 215 provides an interface for performing communications with the central aggregation device 110. Specifically, the X2IF 215 is an interface that directly connects the central aggregation device 110 and the central aggregation device 210 by using the MAC and the RLC, and is preferably an existing open interface. The data transmitted and received by the user device 300 is relayed to the radio base station 100 via the X2IF 215.

(2.2) Remote Device 220

FIG. 4 is a functional block configuration diagram of the remote device 220 for 5G. As illustrated in FIG. 4, the remote device 220 includes a scheduling information receiver 221, a user data receiver 222, an FFT/IFFT processor 223, and a radio communication section 224.

The scheduling information receiver 221 receives scheduling information from the central aggregation device 210. The received scheduling information includes the radio resource allocation information for determining which radio resource is allocated to which user device 300.

The user data receiver 222 receives "a necessary number of code blocks for generating each OFDM symbol" from the central aggregation device 210. For example, the user data receiver 222 receives "a necessary number of code blocks for generating each OFDM symbol" as a piece of data.

After receiving the code blocks from the central aggregation device 210, the FFT/IFFT processor (symbol generator) 223 performs encoding processing on the received code blocks, generates OFDM symbol signals by using the received number of code blocks, and performs FFT (Fast Fourier Transform) processing or IFFT (Inverse Fast Fourier Transform) processing on each OFDM symbol. Note that the encoding processing and the OFDM symbol generating processing, among multiple functions included in the FFT/IFFT processor 223, may be performed by another independent function section.

With the scheduling information received from the central aggregation device 210, the radio communication section 224 performs RF (Radio Frequency) processing on the user data to be transmitted, and transmits a downlink signal to the user device 300 via the PDSCH or a PDCCH (Physical Downlink Control Channel).

(3) Operation of Radio Communication System

Next, descriptions will be provided for operation of the radio communication system 10. Specifically, descriptions will be provided for processing of transmitting a downlink signal performed by the central aggregation device 210 and the remote device 220.

Figure 5:
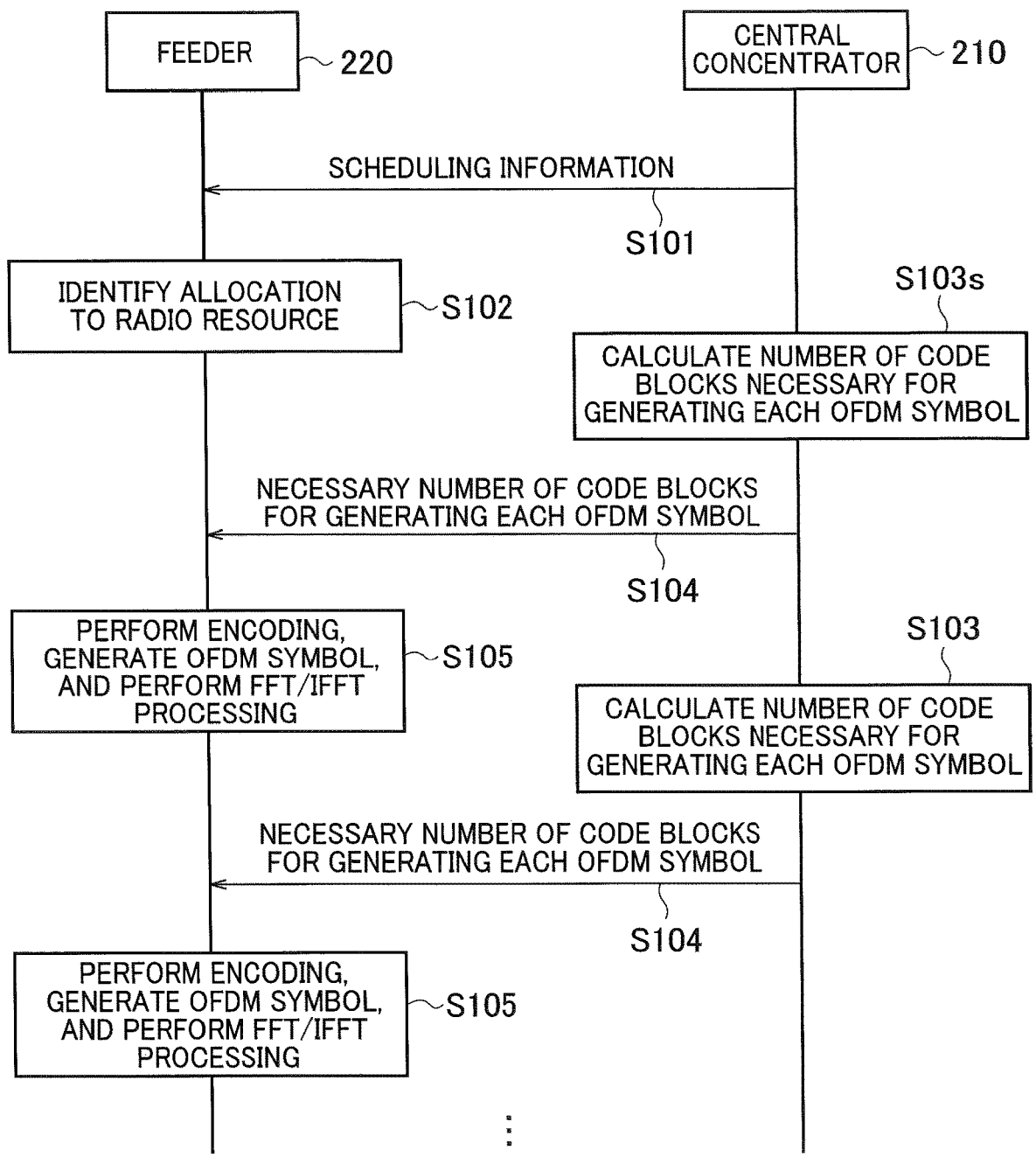
FIG. 5 is a sequence diagram specifically illustrating processing of transmitting a downlink signal performed by the central aggregation device 210 and the remote device 220.

FIG. 5 is a sequence diagram specifically illustrating processing of transmitting a downlink signal performed by the central aggregation device 210 and the remote device 220. In this operation example, descriptions will be provided for a case of cutting out "a necessary number of code blocks for generating each OFDM symbol" from the code blocks of the user data.

In step S101, the central aggregation device 210 transmits scheduling information, which indicates a result of the determination of which radio resource is allocated to which user device 300, to the remote device 220 in a predetermined sub-frame and a TTI (Transmission Time Interval).

In step S102, based on the scheduling information received from the central aggregation device 210, the remote device 220 calculates in advance which radio resource is allocated to which user device 300. Specifically, in order to generate a downlink signal on the PDSCH, the remote device 220 identifies which radio resource is allocated to which user device 300 by using the allocation information of radio resources (such as the MCS and the number of RBs) included in the scheduling information.

In step S103, for each user device 300, the central aggregation device 210 calculates "the number of code blocks necessary for generating each OFDM symbol", which is generated by the remote device 220, out of the multiple code blocks produced by dividing user data into units of encoding processing. Specifically, the central aggregation device 210 calculates "the number of code blocks necessary for generating one OFDM symbol" by dividing the TBS of the user data by the number of OFDM symbols to be used for the PDSCH, for example. Note that "the number of OFDM symbols to be used for the PDSCH" is a value obtained by subtracting the number of OFDM symbols to be used for the PDCCH from the total number of OFDM symbols. For example, "the number of OFDM symbols to be used for the PDSCH" is one of 13 to 11 symbols, obtained by subtracting the number of OFDM symbols to be used for the PDCCH (one, two, or three symbols) from the total number of OFDM symbols (14 symbols).

In step S104, the central aggregation device 210 cuts out as many code blocks as the number calculated in step S103 from the transport block of the user data, and transmits the cut out code blocks to the remote device 220 with the frame protocol between the central aggregation device 210 and the remote device 220. For example, when "the number of code blocks necessary for generating one OFDM symbol" is five, the central aggregation device 210 cuts out a piece of data of five code blocks from the user data and transmits it to the remote device 220. Note that a protocol format of the frame protocol will be described later.

In step S105, after receiving the code blocks from the central aggregation device 210, the remote device 220 performs encoding processing on the received code blocks, generates an OFDM symbol by using the received number of code blocks, and performs the FFT/IFFT processing on the generated OFDM symbol. For example, when "the number of code blocks to be allocated to one OFDM symbol" is five, the central aggregation device 210 transmits five code blocks that are compiled as a piece of data. Once receiving those five code blocks at one time, the remote device 220 generates an OFDM symbol by using those five code blocks and performs the FFT/IFFT processing.

Thereafter, the central aggregation device 210 repeatedly performs steps S103 and S104. In the meantime, the remote device 220 performs step S105 after receiving "a necessary number of code blocks for generating an OFDM symbol" from the central aggregation device 210. At a predetermined timing, the remote device 220 allocates the code blocks after the FFT/IFFT processing to the radio resource (such as RB) based on the allocation information of radio resources identified in step S102, generates a downlink signal for the PDSCH, and transmits it to the user device 300 via a radio transmission channel.

Figure 6:
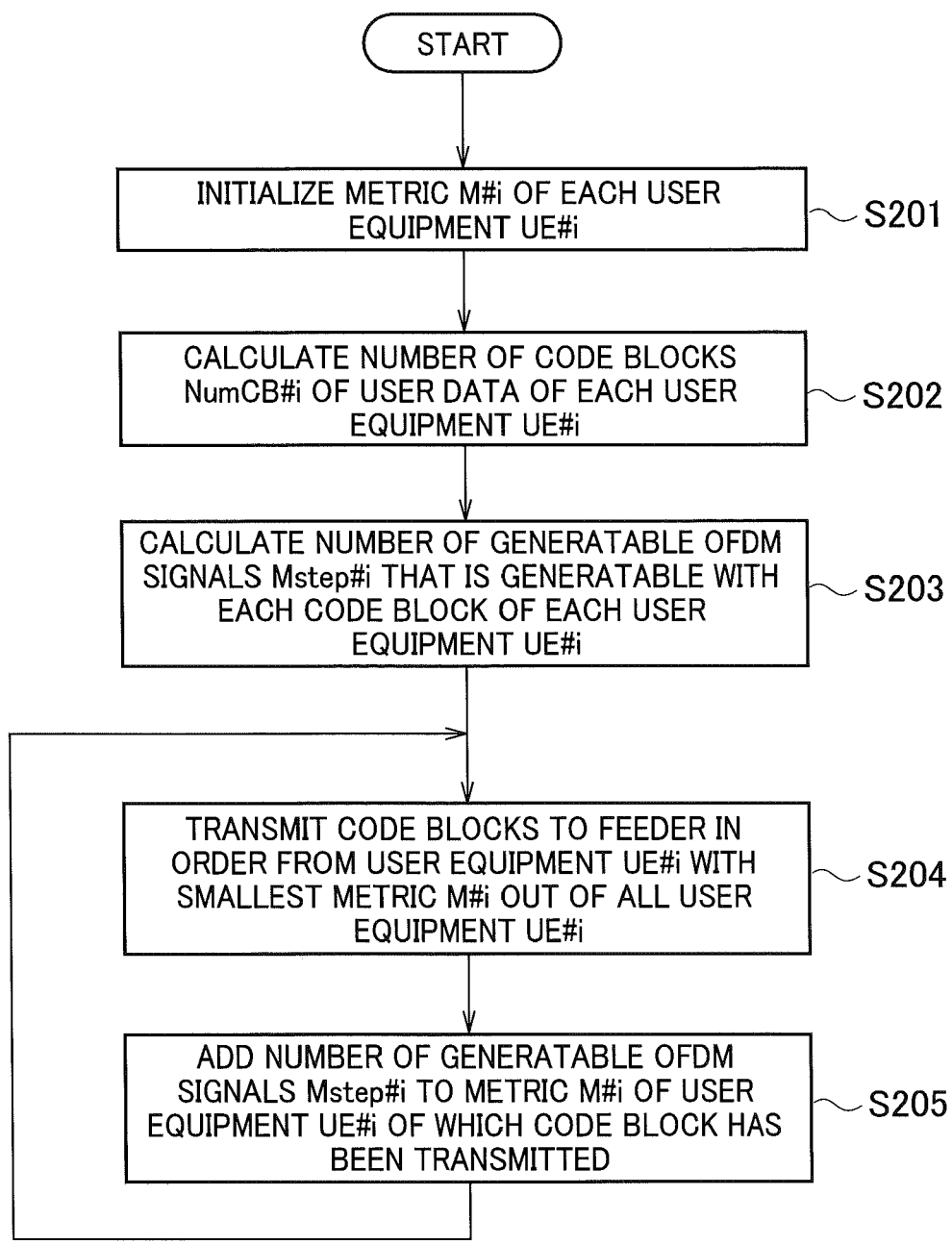
FIG. 6 is a diagram illustrating a procedure of transmitting code blocks.

Next, descriptions will be provided for a specific method of transmitting code blocks by the central aggregation device 210. FIG. 6 is a diagram illustrating a procedure of transmitting code blocks. FIG. 7 is a diagram illustrating metrics used for transmitting each code block and an example of operations of the central aggregation device 210 and the remote device 220 at each timing. Here, the metrics are information related to generating an OFDM symbol. Specifically, each metric is an integrated value of the number of OFDM symbols (later-described Mstep#i) that can be generated with one code block. The metrics are used for each piece of user data.

In step S201, the central aggregation device 210 initializes metric M#i of each user device UE#i to "0". In FIG. 7, this initialization corresponds to "0s" in metrics M#1 to M#3 of user device UE#1 to UE#3 at the time t=0.

In step S202, the central aggregation device 210 calculates the number of code blocks NumCB#i of the user data of each user device UE#i by using the number of RBs, the MCS, and the TBS allocated to the user device UE#i. For example, the central aggregation device 210 calculates a TBS of the user data by using the number of RBs and the MCS allocated to the user device 300, and calculates the number of code blocks of the user data by dividing the TBS by a predetermined size (for example, the maximum size of the code block with a fixed length). Note that, in FIG. 7, the total number of OFDM symbols available for transmission via the PDSCH is 12, the total number of the user device UE#i is three, and the total numbers of code blocks NumCB#1 to NumCB#3 of the corresponding user device UE#i (i=1 to 3) are three, four, and two, respectively.

In step S203, the central aggregation device 210 calculates the number of generatable OFDM signals Mstep#i, which indicates how many OFDM symbols can be generated with each code block of each user device UE#i. The number of generatable OFDM signals Mstep#i is calculated by dividing "the total number of OFDM symbols available for transmission via the PDSCH" by "the total number of code blocks" of each user device UE#i. The reason of this calculation will be generally described below. Note that a method of mapping the user data on each OFDM symbol will be mainly described here, instead of "a necessary number of code blocks for generating each OFDM symbol".

The user data is mapped over the OFDM symbols generating the PDSCH in a time domain. Accordingly, for example, when 12 OFDM symbols are used for generating the PDSCH and the total number of code blocks NumCB#1 of the user data #1 is three, a first code block CB#1 is divided into four and mapped on first to fourth OFDM symbols, a second code block CB#2 is divided into four and mapped on succeeding fifth to eighth OFDM symbols, and a third code block CB#3 is divided into four and mapped on further succeeding ninth to twelfth OFDM symbols.

Likewise, when the total number of code blocks NumCB#2 of the user data #2 is four, a first code block CB#1 is divided into three and mapped on first to third OFDM symbols, a second code block CB#2 is divided into three and mapped on succeeding fourth to sixth OFDM symbols, a third code block CB#3 is divided into three and mapped on further succeeding seventh to ninth OFDM symbols, and a fourth code block #4 is divided into three and mapped on much further succeeding tenth to twelfth OFDM symbols.

Likewise, when the total number of code blocks NumCB#2 of the user data #3 is two, a first code block CB#1 is divided into six and mapped on first to sixth OFDM symbols, and a second code block CB#2 is divided into six and mapped on succeeding seventh to twelfth OFDM symbols.

As described above, once the total number of code blocks of user data is determined, how many OFDM symbols can be generated with one code block, or the number of generatable OFDM signals Mstep#i can be calculated. In the above example, the number of generatable OFDM signals Mstep#1 of the user data #1 is four (=12/3). For only the case of this user, the first four OFDM symbols can be generated with the first code block. Likewise, the number of generatable OFDM signals Mstep#2 of the user data #2 is three (=12/4). For only the case of this user, the first three OFDM symbols can be generated with the first code block. Likewise, the number of generatable OFDM signals Mstep#3 of the user data #3 is six (=12/2). For only the case of this user, the first six OFDM symbols can be generated with the first code block.

In step S204, at a predetermined time, the central aggregation device 210 transmits code blocks to the remote device 220 in order from the user device UE#i with the smallest metric M#i out of all the user device UE#i. In this process, if metrics of the multiple user devices UE#i are the same at the predetermined time, the central aggregation device 210 may select one randomly from the user device UE#i having the same metric, or may select user device UE#i having the smallest identifier i or the largest identifier i.

In step S205, the central aggregation device 210 adds the number of generatable OFDM signals Mstep#i to the metric M#i of the user device UE#i the code block of which the central aggregation device 210 has transmitted in step S204, and returned to step S204. Thereafter, steps S204 and S205 are repeated. Note that, when the codeword is the multiple-codeword, the central aggregation device 210 manages and calculates metric M#i for each codeword.

Here, for generating each OFDM symbol, the remote device 220 needs to receive not only one user data but also a code block of other users data to be mapped on OFDM symbols. Thus, in fact, the central aggregation device 210 refers to the metric M#i of each user device UE#i, and transmits the code blocks of all users data at one time in order to map the code blocks of all users data on one OFDM symbol. In the case of FIG. 7, at the time t=1, the central aggregation device 210 transmits the code block CB#1 of the user device #1, the code block CB#1 of the user device #2, and the code block CB#1 of the user device #3 as a piece of data. At the time t=1, because the remote device 220 has already received the code blocks of all users data #1 to #3 necessary for generating the first to third OFDM symbols, the first to the third OFDM symbols can be generated. Next, at the time t=2, the remote device 220 transmits the code block CB#2 of the user device UE#2. At the time t=2, because the remote device 220 has already received the code blocks of all users data #1 to #3 necessary for generating the fourth OFDM symbol, OFDM symbols up to the fourth can be generated.

Here, descriptions will be provided for the metric M#i. As described above, the metric M#i is an integrated value of the number of OFDN symbols that can be generated with one code block, and is used for each piece of user data. In the case of the above example, the metrics M#1 to M#3 of the user device UE#1 to UE#3 are 4, 3, and 6, respectively. In the meantime, for generating each OFDM symbol, all users data for constituting the OFDM symbol are necessary. Thus, at the time point when the code blocks related to all users data are transmitted, the central aggregation device 210 can understand that the remote device 220 can generate up to the same number of OFDM symbols as three, which is the smallest among four, three, and six.

Accordingly, in the central aggregation device 210, the metric M#i can be described as "information indicating that OFDM symbols up to a predetermined number can be generated among the multiple OFDM symbols generated in order by the remote device 220". In addition, at the above-described time point of transmission, the central aggregation device 210 can simultaneously understand that the forth and subsequent OFDM symbols cannot be generated. Considering that OFDM symbols only up to the third can be generated, the metric M#i can also be described as "information related to the order of generating the multiple OFDM symbols generated in order by the remote device 220". In other words, from the values of the metric M#i of each user device UE#i, the central aggregation device 210 can understand that OFDM symbols up to the third can be generated before the fourth and subsequent OFDM symbols, for example.

Moreover, the central aggregation device 210 may notify the remote device 220 of the metric M#i and may share the metric M#i with the remote device 220. In this case, in the remote device 220, the metric M#i may be used as "information for determining whether OFDM symbols up to the predetermined number are generated among the multiple OFDM symbols generated in order".

In either case, in the central aggregation device 210 and the remote device 220, the metric M#i is used as "information that indicates order or a range of generating the multiple OFDM symbols generated in order", or "information that is related to generation of the multiple OFDM symbols generated in order". The central aggregation device transmits code blocks based on the metric M#i.

Next, descriptions will be provided for a frame protocol used between the central aggregation device 210 and the remote device 220. The central aggregation device 210 may include in the frame protocol, an identifier of a code block, an identifier of user data, an identifier of the user device 300, an identifier of a transport block in which user data are transmitted, an identifier indicating what number code block counted from the beginning of the transport block, a size of the code block, and the like, for example. Detailed descriptions will be provided hereafter.

Figure 8:
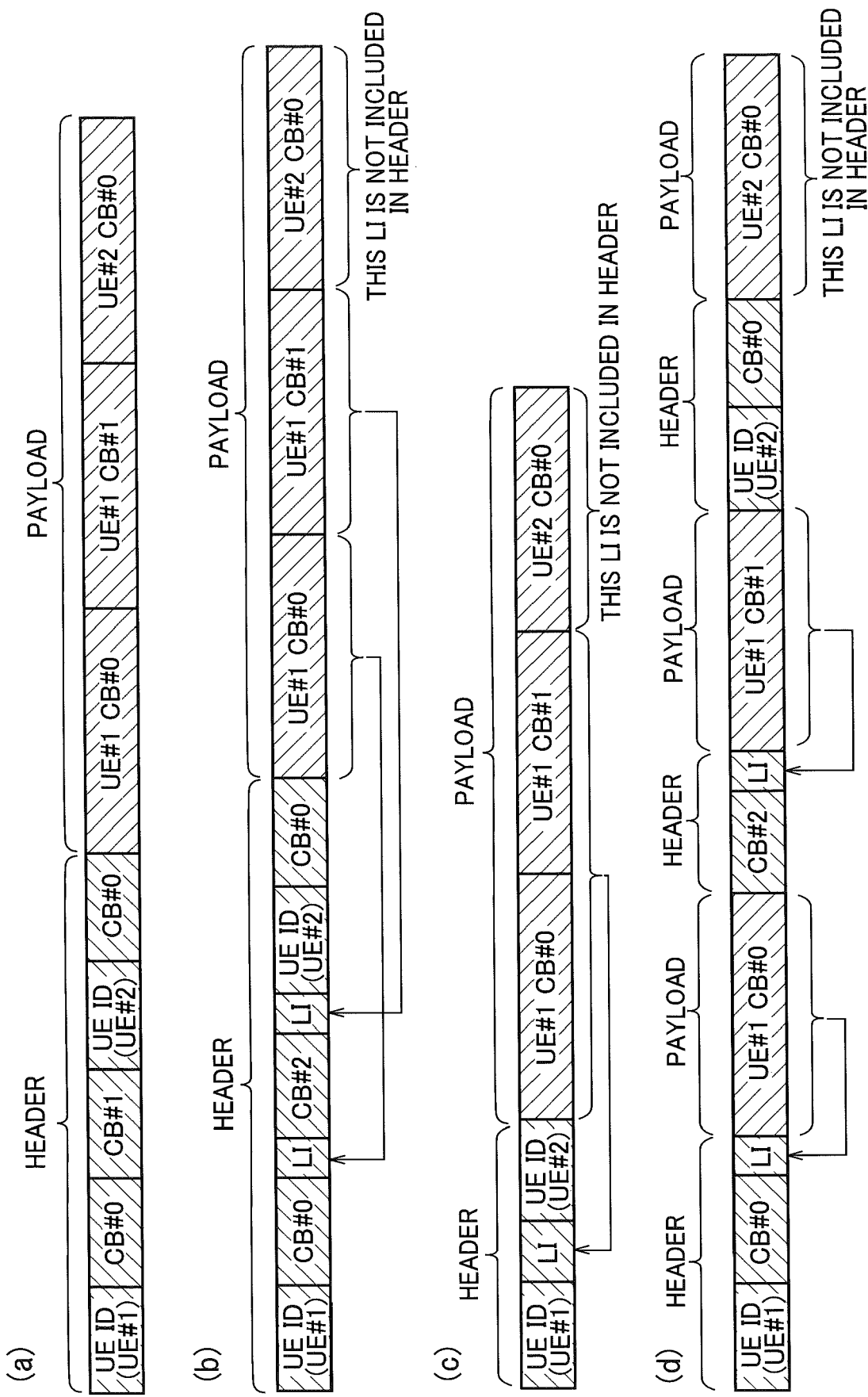
FIG. 8 is a diagram illustrating an example of protocol formats of a frame protocol used between the central aggregation device 210 and the remote device 220.

FIG. 8 is a diagram illustrating examples of protocol formats of the frame protocol. Each of the illustrated protocol formats includes a "header field" and a "payload field".

The "header field" is a region in which information is set, the information indicating what type of data or the like the data of "payload field" are. In the present embodiment, an identifier of user data, an identifier of a code block, a block length of a code block, and the like are included in "header field". The "payload field" is a region in which user data is set, the user data being transmitted to the user device 300. In the present embodiment, code blocks of the user data are included in "payload field".

Specifically, as illustrated in FIG. 8(a), the "header field" includes information indicating which code block of which user device 300 is included in the user data in the "payload field". In a case of using the multiple-codeword, a "header field" may include a codeword identifier for identifying each codeword.

In addition, as illustrated in FIG. 8(b), the "header field" may include the block length (Length Indicator) of the code block for each code block. In this case, the block length of the last code block may not be included because the block length of the last code block can be calculated implicitly from the entire length.

Moreover, the remote device 220 can calculate each block length of the code blocks. Thus, when transmitting multiple code blocks always in order, the central aggregation device 210 does not necessarily need to individually notify the remote device 220 of the block lengths of the multiple code blocks. Hence, as illustrated in FIG. 8(c), the "header field" may include the total block length corresponding to the multiple code blocks. Based on scheduling information of each user that is separately communicated from the central aggregation device 210, the remote device 220 can separate multiple code blocks into individual code blocks.

Furthermore, as illustrated in FIG. 8(d), each code block may be included right after a header field including the identifier and the block length of the corresponding code block. With this, the remote device 220 receives data of a combination of the code block and the identifier of the code block, and thereby identifies the code block at the timing of receiving the code block. This further enhances concurrent processing such as encoding. Alternatively, each code block may be arranged after a header field, which is not right after the header field, and some data may be included between the header field and the code block.

Figure 9:
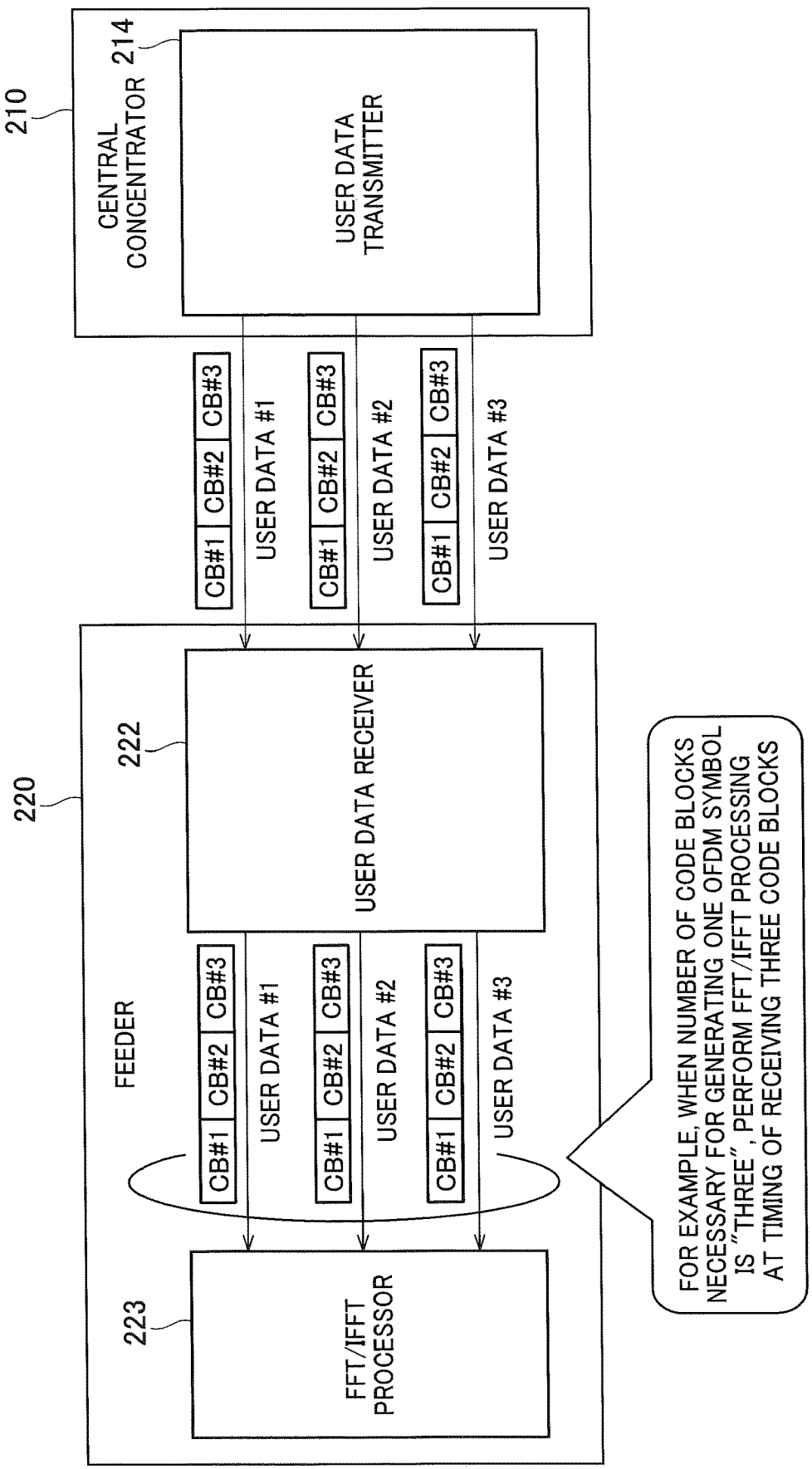
FIG. 9 is a diagram illustrating an example of transmitting code blocks from the central aggregation device 210 to the remote device 220.
Figure 10:
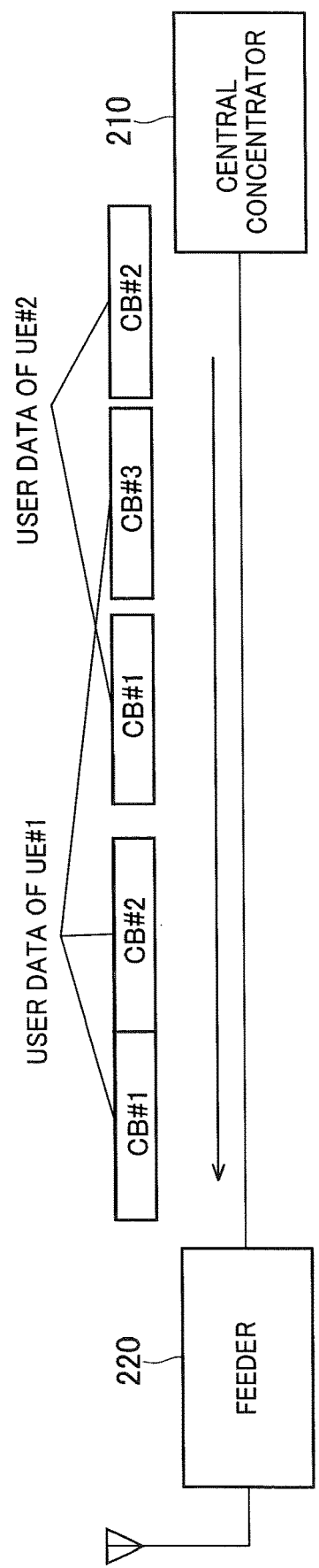
FIG. 10 is a diagram illustrating an example of transmitting code blocks from the central aggregation device 210 to the remote device 220.

FIG. 9 is a diagram illustrating an example of transmitting code blocks from the central aggregation device 210 to the remote device 220. When the number of code blocks necessary for generating an OFDM symbol is three, and the code block CB#1 of the user data #1, the code block CB#1 of the user data #2, and the code block CB#1 of the user data #3 are sequentially transmitted, the remote device 220 generates one OFDM symbol after receiving the third code block. Then, the FFT/IFFT processing is ready to start. Another transmission example is illustrated in FIG. 10. For example, after receiving two code blocks CB#1 and CB#2 of the user device UE#1 and the code block CB#1 of the user device UE#2, the remote device 220 is ready to start the FFT/IFFT processing. With this, delay in the FFT/IFFT processing can be reduced.

(4) Advantageous Effect

According to the above-described present embodiment, in a radio base station (communication system) including the central aggregation device 210 and the remote device 220, the central aggregation device 210 transmits code blocks (divided data blocks) in a number necessary for generating an OFDM symbol as a piece of data to the remote device 220, the code blocks being produced by dividing user data into units of encoding processing. With this, the remote device 220 can generate an OFDM symbol by using as many code block as the number included in the piece of data without waiting for arrival of succeeding code blocks. As a result, the radio base station can sustain a reduction in delay in FFT/IFFT processing by code blocking user data, even in a case where the functions of upper layers such as the MAC scheduler and the function of the radio physical layer are implemented separately.

In addition, in the present embodiment, the central aggregation device 210 transmits code blocks based on information (metrics) indicating order or a range of generating multiple OFDM symbols. With this, the remote device 220 can understand the order or the range of generating each OFDM symbol. As a result, the radio base station can surely sustain a reduction in delay in FFT/IFFT processing by code blocking user data, even in a case where the functions of upper layers such as the MAC scheduler and the function of the radio physical layer are implemented separately.

Moreover, in the present embodiment, the central aggregation device 210 further transmits at least one of an identifier of a code block, a block length of a code block, and the total block length of multiple code blocks. Information such as the identifier of a code block can be an element for generating an OFDM symbol. Thus, the remote device 220 surely generates an OFDM symbol by using the identifier of a code block and the like. As a result, the radio base station can surely sustain a reduction in delay in FFT/IFFT processing by code blocking user data, even in a case where the functions of upper layers such as the MAC scheduler and the function of the radio physical layer are implemented separately.

Furthermore, in the present embodiment, the central aggregation device 210 transmits a code block after a header field including an identifier of the code block. Since the remote device 220 receives a combination of the code block and the identifier of the code block, processing such as the encoding processing on the code block can be performed concurrently. As a result, a reduction in delay in FFT/IFFT processing can be surely sustained.

(5) Others

It should be noted that although descriptions have been provided for a case of cutting out "a necessary number of code blocks for generating each OFDM symbol" from the code blocks of user data in the present embodiment, the same operations can be performed also in a case of cutting out "as many code blocks as the number of bits necessary for generating each OFDM symbol", and the same effect can be obtained.

In addition, although descriptions have been provided for a case of "cutting out five code blocks as a piece of data from user data and transmitting it to the remote device 220" in step S104 in the present embodiment, the central aggregation device 210 may divide all code blocks of the user data into multiple code blocks in advance, and transmit a necessary number of code blocks for generating each OFDM symbol to the remote device 220 after compiling the code blocks into a piece or within a very short time.

Moreover, in the present embodiment, the central aggregation device 210 may further include a data structure information transmitter 216, which will be described in a second embodiment. In this case, the data structure information transmitter 216 transmits data structure information, which will be described in the second embodiment, to the remote device 220. The data structure information, details of which will be described in the second embodiment, is information indicating a size of multiple code blocks (such as the number, the number of bits, and the bit length, for example).

Second Embodiment

(1) Overall Schematic Configuration of Radio Communication System

The overall configuration of the radio communication system 10 according to the present embodiment is the same as in the first embodiment. Thus, descriptions thereof here are omitted.

(2) Functional Block Configuration of Radio Communication System

Next, descriptions will be provided for a functional block configuration of the radio communication system 10 according to the present embodiment. Specifically, descriptions will be provided for functional block configurations of the central aggregation device 210 and the remote device 220 in the radio base station 200.

(2.1) Central Aggregation Device 210

Figure 11:
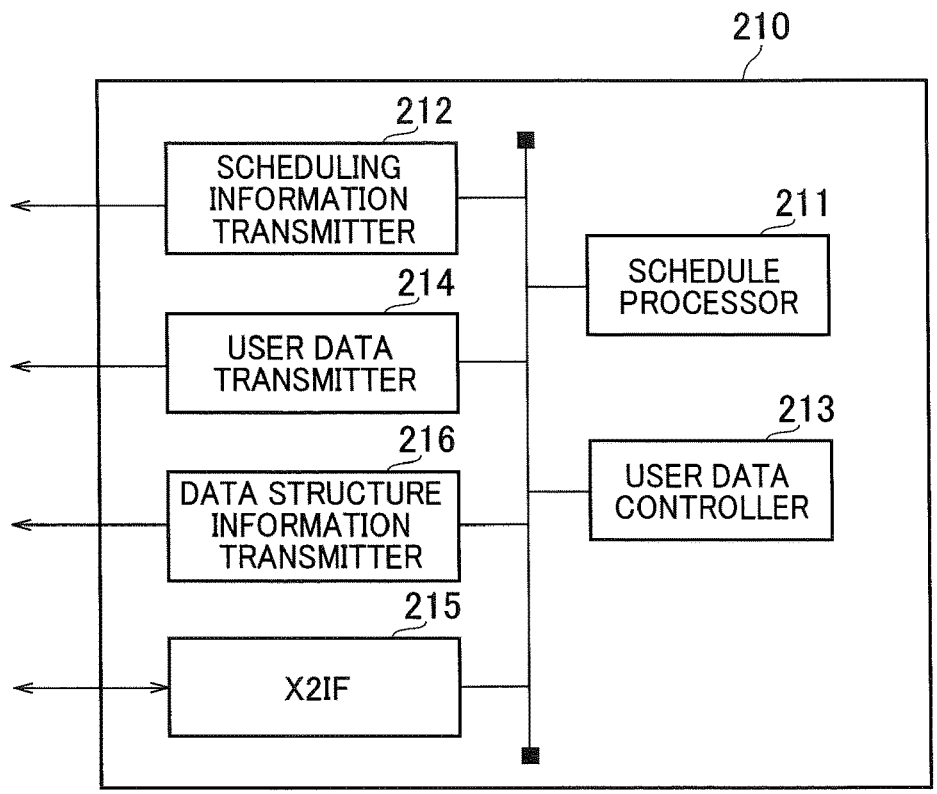
FIG. 11 is a functional block configuration diagram of the central aggregation device 210 in 5G.

FIG. 11 is a functional block configuration diagram of the central aggregation device 210 for 5G. As illustrated in FIG. 11, the central aggregation device 210 further includes the data structure information transmitter 216 in addition to the function sections in the first embodiment.

The schedule processor 211 (MAC scheduler) performs schedule processing to determine which radio resource is allocated to which user device 300. Specifically, the schedule processor 211 generates scheduling information (allocation information of radio resources) for the user device 300 that is selected by the schedule processing. The scheduling information includes the number of RBs (Resource Blocks), an MCS (Modulation and Coding Scheme), a TBS (Transport Block Size), the number of transmission Ranks, the number of downlink assignments (DL assignments), and the like, for example.

The scheduling information transmitter 212 transmits the scheduling information generated by the schedule processor 211 to the remote device 220.

The user data controller 213 generates multiple code blocks by dividing user data in a transport block into units of the encoding processing. Specifically, the user data controller 213 calculates a TBS by using the number of RBs and the MCS that are allocated by the schedule processor 211, calculates the number of code blocks by dividing the TBS by a predetermined size (for example, the maximum size of the code block with a fixed length), and generates as many code blocks as the obtained number.

In addition, the user data controller 213 calculates data structure information indicating a structure of multiple code blocks to be allocated to an OFDM symbol generated by the remote device 220. For example, the user data controller 213 calculates values such as "the number of code blocks necessary for generating each OFDM symbol", "the number of bits of code blocks necessary for generating each OFDM symbol", and "information (metric) indicating order or a range of generating multiple OFDM symbols generated in order". Besides, the user data controller 213 may calculate information such as "information necessary for calculating the number of code blocks or the number of bits of code blocks necessary for generating each OFDM symbol (for example, the number of downlink assignments included in scheduling information and the like)". In other words, information indicating a size of multiple code blocks (such as the number, the number of bits, and the bit length, for example) can be used as the data structure information.

The user data transmitter 214 transmits each code block of corresponding user data generated by the user data controller 213 to the remote device 220. In addition, the user data transmitter 214 may transmit code blocks of each user data to the remote device 220 based on the metric M#i described in the first embodiment.

The data structure information transmitter 216 transmits the data structure information generated by the user data controller 213 to the remote device 220. For example, the data structure information transmitter 216 may notifies the remote device 220 of only "the number of code blocks necessary for generating each OFDM symbol", or of both "the number of code blocks necessary for generating each OFDM symbol" and "the number of bits of code blocks necessary for generating each OFDM symbol". When both pieces of information are notified of, the remote device 220 appropriately selects either one.

The X2IF 215 provides an interface for performing communications with the central aggregation device 110. Specifically, the X2IF 215 is an interface that directly connects the central aggregation device 110 and the central aggregation device 210 by using the MAC and the RLC, and is preferably an existing open interface. The data transmitted and received by the user device 300 is relayed to the radio base station 100 via the X2IF 215.

(2.2) Remote Device 220

Figure 12:
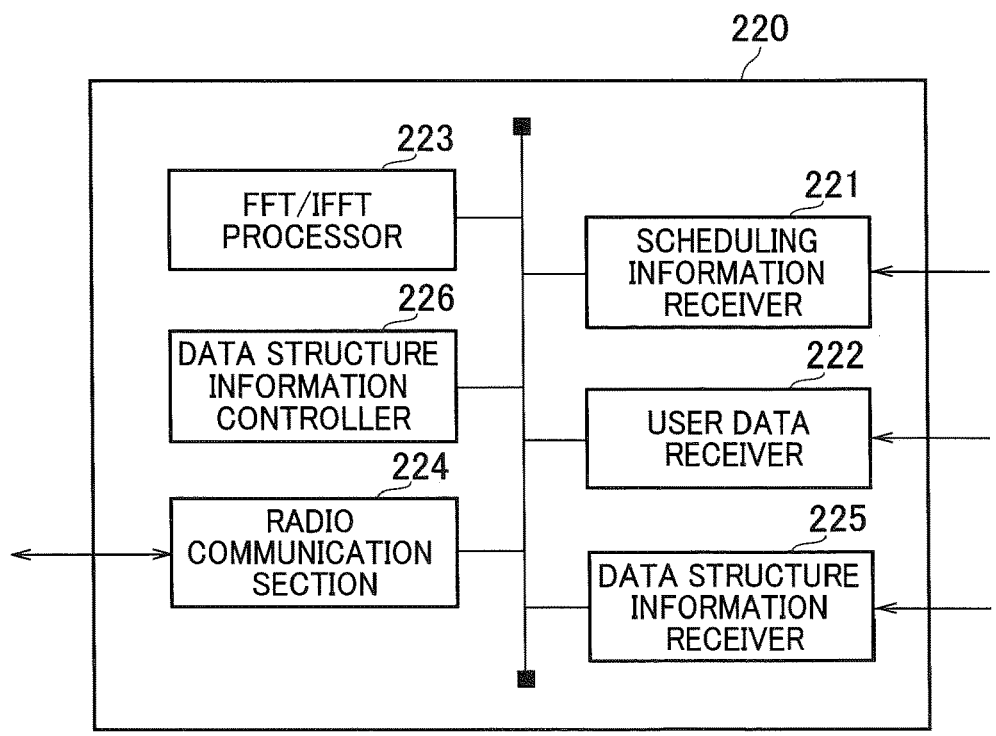
FIG. 12 is a functional block configuration diagram of the remote device 220 in 5G.

FIG. 12 is a functional block configuration diagram of a remote device 220 for 5G. As illustrated in FIG. 12, in addition to the function sections included in the first embodiment, the remote device 220 further includes a data structure information receiver 225 and a data structure information controller 226.

The scheduling information receiver 221 receives scheduling information from the central aggregation device 210. The received scheduling information includes radio resource allocation information for determining which radio resource is allocated to which user device 300.

The user data receiver 222 receives each code block of corresponding user data from the central aggregation device 210.

The data structure information receiver 225 receives data structure information from the central aggregation device 210. The received data structure information includes information indicating a structure of multiple code blocks to be allocated to an OFDM symbol.

When receiving "information necessary for calculating the number of code blocks or the number of bits of code blocks necessary for generating each OFDM symbol" as the data structure information from the central aggregation device 210, the data structure information controller 226 calculates "the number of code blocks or the number of bits of code blocks necessary for generating each OFDM symbol" based on that received information.

The FFT/IFFT processor (symbol generator) 223 performs encoding processing on the code blocks received from the central aggregation device 210, and generates an OFDM symbol signal by using as many code blocks as "the number of code blocks or the number of bits of code blocks necessary for generating each OFDM symbol" included in the received data structure information, or as many code blocks as "the number of code blocks or the number of bits of code blocks necessary for generating each OFDM symbol" calculated by the data structure information controller 226. Thereafter, the FFT/IFFT processor 223 performs FFT processing or IFFT processing on each OFDM symbol.

With the scheduling information received from the central aggregation device 210, the radio communication section 224 performs RF processing on the user data to be transmitted, and transmits a downlink signal to the user device 300 via the PDSCH or the PDCCH.

(3) Operation of Radio Communication System

Next, descriptions will be provided for operation of the radio communication system 10. Specifically, descriptions will be provided for processing of transmitting a downlink signal by the central aggregation device 210 and the remote device 220.

Figure 13:
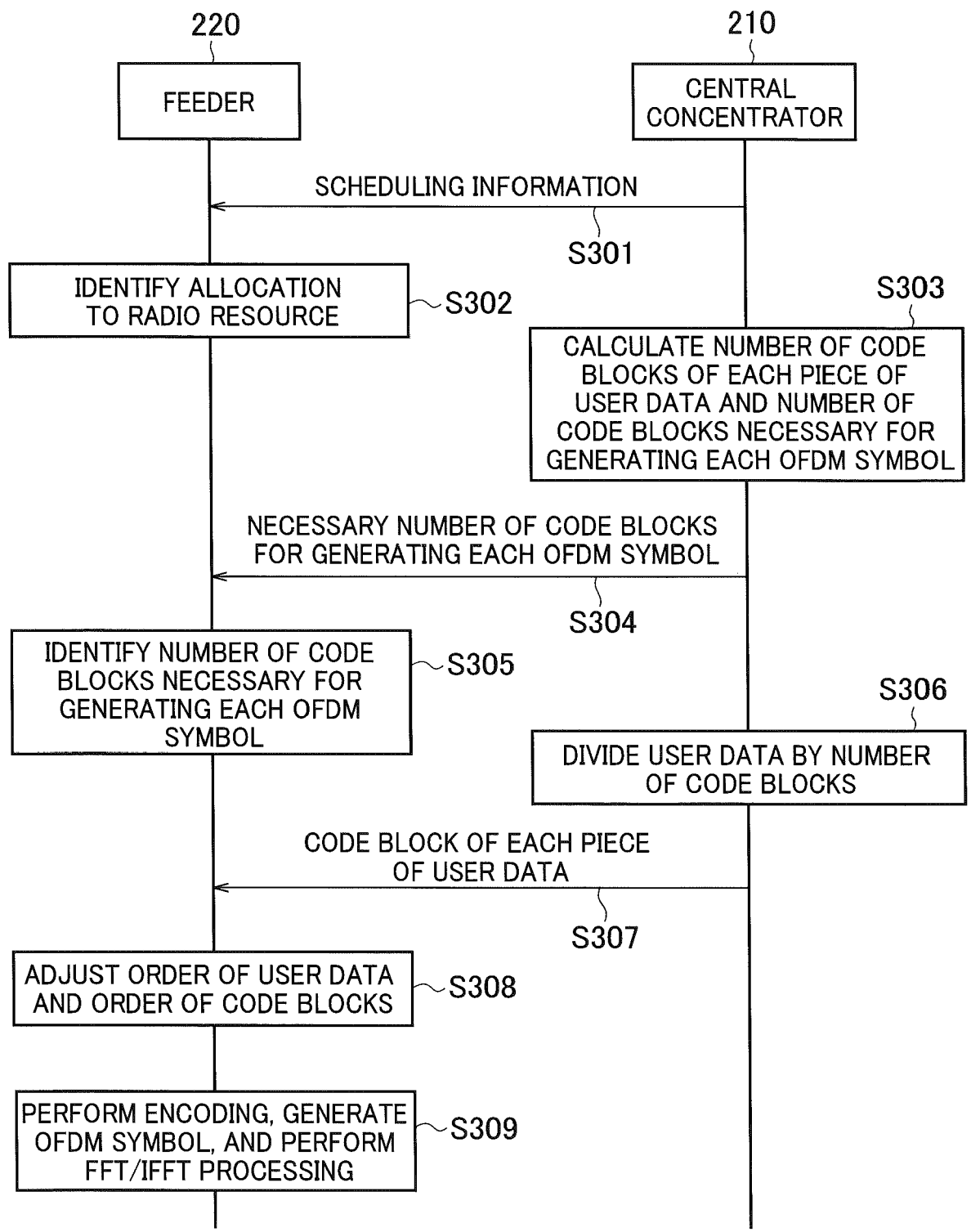
FIG. 13 is a sequence diagram specifically illustrating processing of transmitting a downlink signal by the central aggregation device 210 and the remote device 220.

FIG. 13 is a sequence diagram specifically illustrating processing of transmitting a downlink signal by the central aggregation device 210 and the remote device 220. In this operation example, descriptions will be provided for a case of using "the number of code blocks necessary for generating each OFDM symbol" as the data structure information.

In step S301, the central aggregation device 210 transmits scheduling information, which indicates a result of the determination of which radio resource is allocated to which user device 300, to the remote device 220 in a predetermined sub-frame and a TTI.

In step S302, based on the scheduling information received from the central aggregation device 210, the remote device 220 calculates in advance which radio resource is allocated to which user device 300. Specifically, as described in step S102, the remote device 220 identifies the allocation of radio resources by using the radio resource allocation information (such as the MCS and the number of RBs) included in the scheduling information.

In step S303, for each of the user device 300, the central aggregation device 210 calculates "the number of code blocks of each user data", and calculates "the number of code blocks necessary for generating each OFDM symbol by the remote device 220".

For example, the central aggregation device 210 calculates "the number of code blocks of user data" by calculating a TBS of user data by using the number of RBs and the MCS allocated to the user device 300 and dividing the TBS by a predetermined size (for example, the maximum size of a code block with a fixed length). In addition, the central aggregation device 210 calculates "the number of code blocks necessary for generating one OFDM symbol" by dividing the TBS by the number of OFDM symbols used for the PDSCH.

Note that, when multiple codewords can be transmitted by the MIMO, the central aggregation device 210 calculates the TBS in accordance with the number of codewords. For example, when two codewords can be transmitted, the central aggregation device 210 generates two TBSs.

In addition, the maximum size of a code block may be a specified fixed value, a value depending on a processing ability of the central aggregation device 210 or the remote device 220, or a value based on setting information of the central aggregation device 210 or the remote device 220.

Moreover, the number of OFDM symbols used for the PDSCH is a value that is obtained by subtracting the number of OFDM symbols used for the PDCCH from the total number of OFDM symbols. For example, the number of OFDM symbols used for the PDSCH is one of 13 symbols to 11 symbols, which are obtained by subtracting the number of OFDM symbols used for the PDCCH (one symbol, two symbols, or three symbols) from the total number of OFDM symbols (14 symbols).

In step S304, the central aggregation device 210 notifies the remote device 220 of "the number of code blocks necessary for generating each OFDM symbol", which is calculated in step S303, with the frame protocol between the central aggregation device 210 and the remote device 220. To be specific, the central aggregation device 210 notifies the remote device 220 of "the number of code blocks necessary for generating each OFDM symbol" for the user device 300 that performs down scheduling in the sub-frame and the TTI.

In step S305, in accordance with the clear notification of "the number of code blocks necessary for generating each OFDM symbol" is provided from the central aggregation device 210, the remote device 220 identifies (understands) "the number of code blocks necessary for generating each OFDM symbol" based on the content of the notification.

In step S306, the central aggregation device 210 divides each user data into multiple code blocks by using "the number of code blocks of each user data" calculated in step S303.

In step S307, the central aggregation device 210 sequentially transmits each code block of corresponding user data, which are divided in step S306, to the remote device 220 with the frame protocol between the central aggregation device 210 and the remote device 220. At that time, the central aggregation device 210 may include information, for example, such as an identifier of a code block in the above-described frame protocol, like the case of the first embodiment. Note that descriptions of a specific example of a protocol format of the frame protocol are the same as those described in the first embodiment. The protocol format used in the first embodiment is also applicable to the second embodiment.

In step S308, the remote device 220 adjusts the order of the user data and the order of the code blocks received from the central aggregation device 210 in order to generate each OFDM symbol surely in the order. For example, the remote device 220 refers to an identifier of user data included in a code block to adjust the order of the user data so as to make the identifiers in the ascending order.

In step S309, based on "the number of code blocks necessary for generating each OFDM symbol" identified in step S305, the remote device 220 generates an OFDM symbol after receiving as many code blocks as that identified number, and performs FFT/IFFT processing on the generated OFDM symbol.

At that time, the remote device 220 may count the number of code blocks of each piece of user data that is sequentially transmitted from the central aggregation device 210, and may determine whether the number of the transmitted code blocks reaches "the number of code blocks necessary for generating each OFDM symbol".

In addition, the remote device 220 may notifies the central aggregation device 210 of delivery confirmation information of receiving code blocks. For example, when receiving a code block, the remote device 220 notifies the central aggregation device 210 of an ACK response, and when receiving no code block even after a predetermined time passes, the remote device 220 notifies the central aggregation device 210 of a NACK response.

Moreover, when the number of the received code blocks does not match "the number of code blocks necessary for generating each OFDM symbol" that is given by the central aggregation device 210, the remote device 220 may notifies the central aggregation device 210 that the numbers of code blocks do not match. At that time, the remote device 220 may be configured not to perform processing on radio transmission to the user device 300 based on the already received code blocks.

Figure 14:
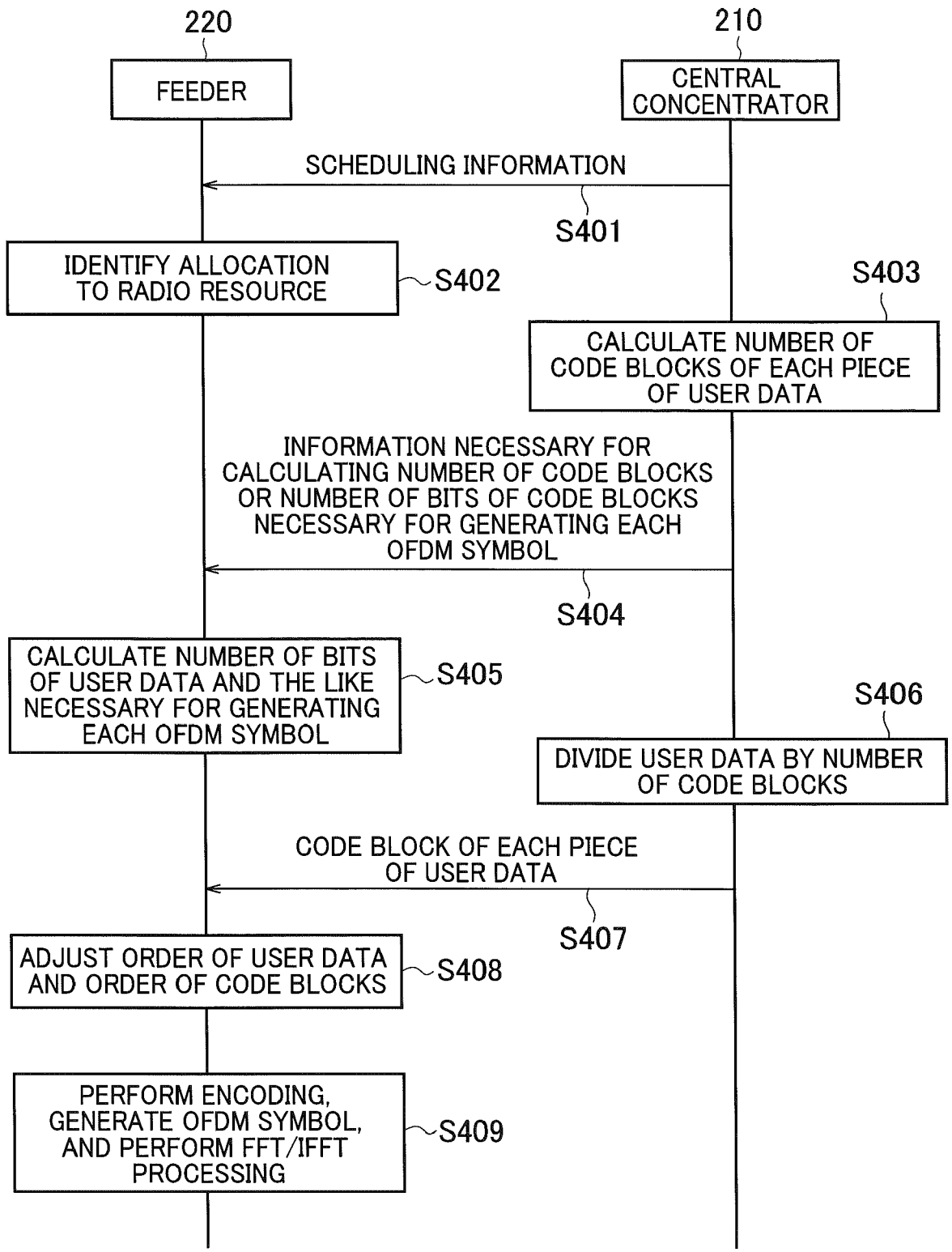
FIG. 14 is a sequence diagram specifically illustrating processing of transmitting a downlink signal by the central aggregation device 210 and the remote device 220.

FIG. 14 is a sequence diagram specifically illustrating processing of transmitting a downlink signal by the central aggregation device 210 and the remote device 220. In this operation example, descriptions will be provided for a case of using "information necessary for calculating the number of code blocks or the number of bits of code blocks necessary for generating each OFDM symbol" as code block structure information.

In step S401, the central aggregation device 210 transmits scheduling information, which indicates a result of the determination of which radio resource is allocated to which user device 300, to the remote device 220 in a predetermined sub-frame and a TTI.

In step 9402, based on the scheduling information received from the central aggregation device 210, the remote device 220 calculates in advance which radio resource is allocated to which user device 300. Specifically, as described in step S102, the remote device 220 identifies the allocation of radio resources by using the radio resource allocation information (such as the MCS and the number of RBs) included in the scheduling information.

In step 9403, for each user device 300, the central aggregation device 210 calculates "the number of code blocks of each user data". At that time, like the operation in step S303, the central aggregation device 210 may calculate "the number of code blocks or the number of bits of code blocks necessary for generating each OFDM symbol by the remote device 220".

In step S404, the central aggregation device 210 notifies the remote device 220 of "information necessary for calculating the number of code blocks or the number of bits of code blocks necessary for generating each OFDM symbol" by using the frame protocol between the central aggregation device 210 and the remote device 220. For example, the central aggregation device 210 notifies the remote device 220 of the number of downlink assignments. The remote device 220 can calculate "the number of code blocks or the number of bits of code blocks necessary for generating each OFDM symbol" by using the number of downlink assignments provided by the central aggregation device 210. Note that, when "information necessary for calculating the number of code blocks or the number of bits of code blocks necessary for generating each OFDM symbol" is already included in the scheduling information, step S404 may be omitted.

In step S405, based on "information necessary for calculating the number of code blocks or the number of bits of code blocks necessary for generating each OFDM symbol" given by the central aggregation device 210, the remote device 220 calculates "the number of code blocks or the number of bits of code blocks necessary for generating each OFDM symbol". For example, when the number of downlink assignments is included in scheduling information, the remote device 220 uses the scheduling information as "information necessary for calculating the number of code blocks or the number of bits code blocks necessary for generating each OFDM symbol". Then, the remote device 220 calculates "the number of code blocks necessary for generating each OFDM symbol" based on the rule of the communication standard by using the information included in the scheduling information such as the number of downlink assignments, the number of RBs, the MCS, and the TBS in each PDCCH, and depending on the necessity, by further using a conversion table defined in advance in the communication standard. With this, the remote device 220 can estimate "the number of code blocks necessary for generating each OFDM symbol".

In step S406, the central aggregation device 210 divides each user data into multiple code blocks by using "the number of code blocks of each user data" calculated in step S403.

In step S407, the central aggregation device 210 sequentially transmits each code block of corresponding user data, which are divided in step S406, to the remote device 220 with the frame protocol between the central aggregation device 210 and the remote device 220. Descriptions of a specific example of a protocol format of the frame protocol are the same as those described in the first embodiment.

In step S408, the remote device 220 adjusts the order of the user data and the order of the code blocks received from the central aggregation device 210 in order to generate each OFDM symbol surely in the order. Descriptions of a specific example of how to adjust the order are the same as those described in step S307.

In step S409, based on "the number of code blocks or the number of bits of code blocks necessary for generating each OFDM symbol" calculated in step S405, the remote device 220 generates an OFDM symbol after receiving as many code blocks as that calculated number or the number of bits, and performs FFT/IFFT processing on the generated OFDM symbol.

(4) Advantageous Effect

According to the above-described present embodiment, in a radio base station (communication system) including the central aggregation device 210 and the remote device 220, the central aggregation device 210 transmits data structure information to the remote device 220, the data structure information being code blocks (divided data blocks) produced by dividing user data into units of encoding processing and indicating a structure of multiple code blocks to be allocated to an OFDM symbol. With this, the remote device 220 can generate an OFDM symbol by using the data structure information without waiting for arrival of succeeding code blocks. As a result, the radio base station can sustain a reduction in delay in FFT/IFFT processing by code blocking user data, even in a case where the functions of upper layers such as the MAC scheduler and the function of the radio physical layer are implemented separately.

In addition, in the present embodiment, the above-described data structure information is information indicating a size of multiple code blocks. With this, the remote device 220 can understand the size of the code blocks. As a result, the radio base station can surely sustain a reduction in delay in FFT/IFFT processing by code blocking user data, even in a case where the functions of upper layers such as the MAC scheduler and the function of the radio physical layer are implemented separately.

(5) Others

Note that although descriptions have been provided for a case of using "the number of code blocks necessary for generating each OFDM symbol" as data structure information in the present embodiment, the same operations can be performed also in a case of using "the number of bits of code blocks necessary for generating each OFDM symbol", and the same effect can be obtained.

OTHER EMBODIMENTS

Although the details of the present invention have been disclosed along with the embodiments as above, the present invention is not limited to the above descriptions. It is apparent to those skilled in the art that various modifications and improvements thereto are possible. In addition, the first embodiment and the second embodiment may be combined. For example, in the second embodiment, the central aggregation device 210 may transmit the code block CB#i of each user data based on the metric M#i described in the first embodiment to the remote device 220. Besides, for example, in the first embodiment, the central aggregation device 210 may include the data structure information transmitter 216 described in the second embodiment and transmit data structure information to the remote device 220. The data structure information is, as described above, the information indicating a size of multiple code blocks (such as the number, the number of bits, and the bit length, for example).

<Hardware Configuration and Others>

For example, as illustrated in FIG. 2, the central aggregation device 210 has the MAC and the RLC, and the remote device 220 has the radio section (RF) and the radio physical layer (L1) in the above-described embodiments. However, the protocol stacks that the central aggregation device 210 and the remote device 220 should include are not necessarily limited to the configurations illustrated in FIG. 2.

In addition, although the central aggregation device 210 in FIG. 2 has only the MAC and the RLC, the central aggregation device 210 may further have a PDCP and an RRC. In this case, the central aggregation device 210 may be directly connected to the core network 20 without passing through the central aggregation device 110.

Moreover, although descriptions have been provided mainly using the terms defined in the 3GPP throughout the above embodiments, those terms may be interchanged with other terms. For example, as mentioned also in the above embodiments, the user device 300 may be called a radio communication terminal, a mobile station, a user terminal, or the like, and the radio base station may be called a node, a radio communication device or system, or the like.

Furthermore, for example, the block diagrams in FIGS. 3, 4, 11, and 12 used for describing the above embodiments illustrate functional block diagrams. These functional blocks (constituent sections) are implemented by an arbitrary combination of hardware and/or software. In addition, the method of implementing each functional block is not particularly limited. In other words, functional blocks may be implemented either by a single device formed of physical and/or logical combinations, or by multiple devices formed by connecting directly and/or indirectly (for example with wires and/or wirelessly) two or more devices physically and/or logically separated.

Figure 15:
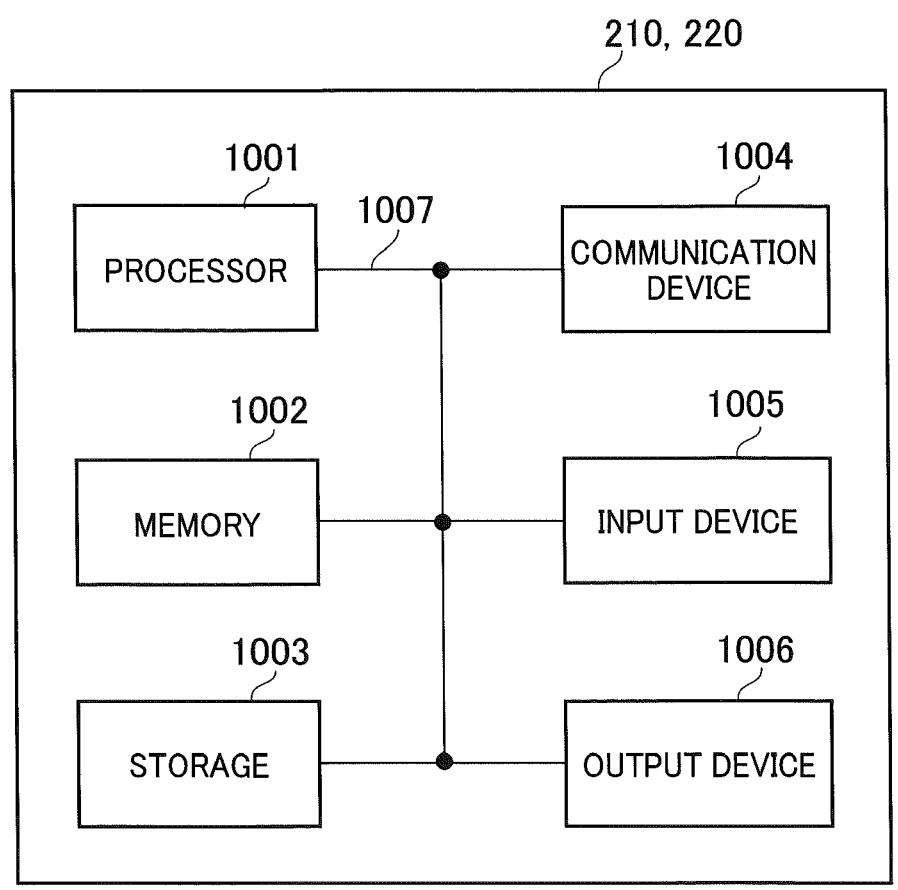
FIG. 15 is a diagram illustrating an example of hardware structures of the central aggregation device 210 and the remote device 220.

Moreover, the central aggregation device 210 and the remote device 220 described above may function as a computer that performs processing of the radio communication method according to the present invention. FIG. 15 is a diagram illustrating an example of hardware structures of the central aggregation device 210 and the remote device 220. As illustrated in FIG. 15, the central aggregation device 210 and the remote device 220 may be configured as a computer device including a processor 1001, a memory 1002, a storage 1003, a communication device 1004, an input device 1005, an output device 1006, a bus 1007, and the like.

The processor 1001, for example, controls the entire computer, running an operating system. The processor 1001 may be formed of a central processing unit (CPU) including an interface with peripheral devices, a control device, a computation device, a register, and the like.

The memory 1002 is a computer-readable recording medium, which may be formed of at least one of, for example, ROM (read only memory), EPROM (erasable programmable ROM), EEPROM (electrically erasable programmable ROM), RAM (random access memory), and the like. The memory 1002 may be called a register, a cache, a main memory, or the like. The memory 1002 is capable of storing a program (program codes), and a software module, and the like that can execute a method according to the embodiments described above.

The storage 1003 is a computer-readable recording medium, which may be formed of at least one of, for example, an optical disc such as a CD-ROM (Compact Disc ROM), a hard disk drive, a flexible disk, a magneto-optical disk (for example, a Compact Disc, a Digital Versatile Disc, a Blu-ray (registered trademark) Disc), a smart card, a flash memory (for example, a card, a stick, a key drive), a floppy (registered trademark) disk, a magnetic strip, and the like. The storage 1003 may be called an auxiliary storage device. The above described memory medium may be, for example, a database, a server, or another suitable medium including the memory 1002 and/or the storage 1003.

The communication device 1004 is hardware (a transmission reception device) for communication between computers via a wired and/or wireless network, and is also called, for example, a network device, a network controller, a network card, a communication module or the like.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. Note that the input device 1005 and the output device 1006 may be integrated into a single unit (for example, a touch panel).

In addition, the devices such as the processor 1001 and the memory 1002 are connected to each other with the bus 1007 to communicate information. The bus 1007 may be formed of a single bus or formed of multiple different buses depending on the devices.

<Communication of Data or Information, Signaling>

In addition, the method of communicating data or information is not limited to the embodiments described above, but other methods can be used. For example, the communication of information may be implemented with physical layer signaling (for example, downlink control information (DCI), uplink control information (UCI)), upper layer signaling (for example, RRC signaling, medium access control (MAC) signaling, broadcast information (master information block (MIB)), system information block (SIB)), or other signals, or combinations of these. RRC signaling may be called an RRC message, and may be, for example, an RRC Connection Setup message, an RRC Connection Reconfiguration message, or the like.

<Applicable System>

The aspects/embodiments described in the present specification may be applied to LTE, LTE-Advanced, SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), a system utilizing another appropriate system, and/or the next generation systems that are expanded based on these foregoing systems.

<Processing Procedure and Others>

The processing of the sequences and the flowcharts described in the present specification may be rearranged in order unless it causes a contradiction. For example, the methods described in the present specification present the elements of various steps in exemplary order, and are not limited to the presented specific order.

<Operation of Radio Base Station>

Certain operations performed by the central aggregation device 210 and the remote device 220 in the above-described embodiments are performed by another network node (device) in some cases. Moreover, the functions of the central aggregation device 210 and the remote device 220 may be provided by a combination of other multiple network nodes.

<Directions of Input and Output>

The data and the information described in the present specification can be outputted from an upper layer (or a lower layer) to a lower layer (or an upper layer). The data and the information may be inputted or outputted via multiple network nodes.

<Management of Inputted or Outputted Information>

The inputted or outputted information may be stored in a certain space (for example, a memory), or may be managed by a management table. The inputted or outputted information can be overwritten, and updated, or additional information can be added to it. Outputted information may be deleted. Inputted information may be transmitted to another device.

<Variation of Aspects and Others>

The aspects/embodiments described in the present specification may be used as a single, in combination, or by switching in accordance with the performance. In addition, a performance of notification of certain information (for example, notification of "being X") may not limited to doing explicitly, but also doing implicitly (for example, not performing notification of the certain information)

<Terms>

Regardless of whether it is called software, firmware, middleware, micro codes, or hardware description language, or another name, "Software" should be broadly interpreted to mean instructions, instruction sets, codes, code segments, program codes, a program, a sub program, software modules, an application, a software application, a software package, routines, sub-routines, objects, an executable file, execution threads, a procedure, a function, and others.

In addition, "software", "instruction", and the like may be transmitted and received via a transmission medium. For example, when software is transmitted from a website, a server, or another remote source by using a wired technology such as a coaxial cable, an optical fiber cable, a twist pair, a digital subscriber line (DSL), and the like; and/or a wireless technology such as infrared rays, radio, micro waves, and the like, these wired technology and/or wireless technology are included within the definition of a transmission medium.

"Information", "signals", and the like may be expressed by using any of various different technologies. For example, data, instructions, commands, information, signals, bits, symbols, chips, and the like that can be mentioned throughout the above descriptions may be expressed as electrical voltages, electrical currents, electromagnetic waves, magnetic fields or magnetic particles, optical fields or photons, or a combination of any of these.

Note that the terms used in the descriptions of this specification and/or terms necessary to understand this specification may be replaced with terms having the same or similar meanings. For example, a channel and/or a symbol may be a signal, or a signal may be a message. In addition, a component carrier (CC) may be called a carrier frequency, a cell, and the like.

The terms "system" and "network" are used interchangeably.

Moreover, the values of "information" (including "parameters") may be expressed by absolute values, by relative values from specified values, or by other associated information. For example, radio resources may be instructed by an index.

Names used for "parameters" is not limited in any point. Further, mathematical expressions using these parameters may be different from those implicitly disclosed in the present specification. Since the various channels (such as PUCCH, PDCCH, for example) and information elements (such as TPC, for example) can be identified by any preferred names, the various names given to these various channels and information elements are not limited in any point.

The "base station" can accommodate one or more (for example, three) cells (also called sectors). When a base station has multiple cells, the entire coverage area of the base station can be divided into multiple smaller areas. Each smaller area can also provide communication services using a subsystem of the base station (for example, an indoor small base station RRH: remote radio head). The term "cell" or "sector" means part or the whole of the coverage area provided by a base station and/or a subsystem of the base station that provide communication services in this coverage. Further, the terms "base station", "eNB", "cell", and "sector" can be used interchangeably in this specification. In some cases, a base station is also called terms such as a fixed station, a NodeB, an eNodeB (eNB), an access point, a femtocell, and a small cell.

The "user device" is also called in some cases by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

The expression "based on" used in this specification does not mean "based only on" unless explicitly stated otherwise. In other words, the expression "based on" means both "based only on" and "based at least on".

In addition, the terms "including", "comprising", and other variations thereof are intended to be comprehensive as with "comprise". Moreover, the term "or" used in this specification or the scope of claims is intended not to be exclusive disjunction.

Any reference to the elements using names such as "first", "second", and the like does not limit the number or the order of these elements in general. These names can be used as a convenient way of discriminating two or more elements. Thus, referring to a first element and a second element does not mean that only the two elements can be employed in the specification or that the first element should precede the second element in some way.

In the entirety of this specification, for example, when articles such as a, an, and the in English are added in translation, these articles also mean to include plurality as long as the context does not clearly indicate the singularity.

The "radio frame" may be formed of one or more frames in a time domain. Each frame of the one or more frames may be called a sub-frame in a time domain.

Further, the "sub-frame" may be formed of one or more slots in a time domain.

All of the "radio frame", the "sub-frame", the "slot", and the "symbol" indicate a unit of time of transmitting a signal. The "Radio frame", the "sub-frame", the "slot", and the "symbol" may be called by other names corresponding to them. For example, in the LTE system, radio base stations perform scheduling of allocating radio resources (a frequency band width, transmission power, and the like that can be used at a mobile station) to each mobile station.

The minimum time unit of scheduling may be called "TTI (Transmission Time Interval)". For example, one sub-frame may be called a TTI, multiple sequential sub-frames may be called a TTI, and one slot may be called a TTI.

The "resource block (RB)" is a unit of resource allocation of a time domain and a frequency domain, and may include one or more numbers of sequential subcarriers in the frequency domain. In addition, in a time domain of the resource block, the resource block may include one or more numbers of symbols, and may have a length of one slot, one sub-frame, or one TTI. Each of one TTI and one sub-frame may be formed of one or more resource blocks.

The above-described structures of a radio frame are only an example, and the number of sub-frames included in a radio frame, the number of slots included in a sub-frame, the number of symbols and resource blocks included in a slot, and the number of subcarriers included in a resource block can be variously changed.

Hereinabove, the present invention has been described in detail by use of the foregoing embodiment. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire contents of Japanese Patent Application No. 2016-118051 (filed on Jun. 14, 2016) are incorporated in this specification by reference.

INDUSTRIAL APPLICABILITY

According to the present invention, delay in FFT/IFFT processing can be reduced by code blocking user data, even in a case where a function of an upper layer such as a MAC scheduler and a function of the radio physical layer are implemented separately on a first communication device and a second communication device, respectively.

REFERENCE SIGNS LIST 10 radio communication system
100 radio base station
110 central aggregation device
120 remote device
20 core network
200 radio base station
210 central aggregation device
211 schedule processor
212 scheduling information transmitter
213 user data controller
214 user data transmitter
215 X2IF
216 data structure information transmitter 220 remote device
221 scheduling information receiver
222 user data receiver
223 FFT/IFFT processor
224 radio communication section
225 data structure information receiver
226 data structure information controller
300 user device
1001 processor
1002 memory
1003 storage
1004 communication device
1005 input device
1006 output device
S101-S105, S201-S205, S301-S309, S401-S409 step

The invention claimed is:

1. A communication system comprising:
a first communication device; and
a second communication device,
wherein the first communication device includes a transmitter and a processor,
wherein the processor determines a number of data blocks of encoding processing necessary for generating a single OFDM symbol by the second communication device,
wherein the processor divides user data into the number of data blocks,
wherein the transmitter transmits the number of divided data blocks to the second communication device,
wherein the second communication device includes a controller that generates OFDM symbols by using the number of divided data blocks, and
wherein the transmitter transmits the plurality of divided data blocks based on information indicating an order or a range of a certain two or more number of the OFDM symbols to be generated.

2. A first communication device in communication with a second communication device, the first communication device comprising:
a processor that determines a number of data blocks of encoding processing necessary for the second communication device to generate a single OFDM symbol, wherein the processor divides user data into the number of data blocks; and
a transmitter that transmits the number of divided data blocks to the second communication device,
wherein the transmitter transmits the plurality of divided data blocks based on information indicating an order or a range of a certain two or more number of OFDM symbols to be generated.

3. A second communication device in communication with a first communication device, the second communication device comprising:
a receiver that receives a number of divided data blocks of encoding processing from the first communication device, wherein the number is determined by the first communication device as necessary for the second communication device to generate a single OFDM symbol, and
a controller that generates OFDM symbols by using the number of divided data blocks,
wherein the receiver receives the plurality of divided data blocks based on information indicating an order or a range of a certain two or more number of the OFDM symbols to be generated.

* * * * *